(12) United States Patent
Zeyer et al.

(10) Patent No.: US 10,273,849 B2
(45) Date of Patent: Apr. 30, 2019

(54) INJECTION MODULE AND EXHAUST SYSTEM HAVING AN INJECTION MODULE

(71) Applicant: Robert Bosch GmbH, Stuttgart (DE)

(72) Inventors: Bruno Zeyer, Marbach A.N. (DE); Markus Buerglin, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/035,921

(22) PCT Filed: Sep. 11, 2014

(86) PCT No.: PCT/EP2014/069388
§ 371 (c)(1),
(2) Date: May 11, 2016

(87) PCT Pub. No.: WO2015/071005
PCT Pub. Date: May 21, 2015

(65) Prior Publication Data
US 2016/0265408 A1 Sep. 15, 2016

(30) Foreign Application Priority Data
Nov. 15, 2013 (DE) .......................... 10 2013 223 296

(51) Int. Cl.
*F01N 3/20* (2006.01)
*F01N 3/28* (2006.01)

(52) U.S. Cl.
CPC ......... *F01N 3/2066* (2013.01); *F01N 3/2892* (2013.01); *F01N 2610/1453* (2013.01); *Y02T 10/24* (2013.01)

(58) Field of Classification Search
CPC .......... F01N 2610/1453; F01N 3/2066; F01N 3/2892
See application file for complete search history.

(56) References Cited

U.S. PATENT DOCUMENTS

| 6,382,600 | B1 * | 5/2002 | Mahr | ................. B01D 53/9431 261/115 |
| 8,800,276 | B2 * | 8/2014 | Levin | .................... F01N 3/2892 261/79.2 |
| 8,932,530 | B2 * | 1/2015 | Iijima | ................... F01N 3/2066 422/168 |

(Continued)

FOREIGN PATENT DOCUMENTS

| DE | 4417238 | 9/1994 |
| DE | 102011018569 | 10/2012 |

(Continued)

OTHER PUBLICATIONS

International Search Report for Application No. PCT/EP2014/069388 dated Nov. 21, 2014 (English Translation, 2 pages).

*Primary Examiner* — Patrick D Maines
(74) *Attorney, Agent, or Firm* — Michael Best & Friedrich LLP

(57) ABSTRACT

An injection module (10) for injecting a reducing agent into the exhaust system (22) of an internal combustion engine (2) has at least two outlet openings (12) for discharging at least one reducing agent primary jet (13), the outlet openings (12) being designed in such a way that that the reducing agent primary jets (13) exiting the outlet openings (12) collide and create a spray mist (11) in the exhaust system (22).

16 Claims, 4 Drawing Sheets

(56) References Cited

U.S. PATENT DOCUMENTS

| | | | |
|---|---|---|---|
| 2003/0110763 A1 | 6/2003 | Pawson et al. | |
| 2007/0036694 A1* | 2/2007 | Nishioka | B01D 53/90 422/168 |
| 2010/0083643 A1* | 4/2010 | Hayashi | B01D 53/90 60/297 |
| 2010/0263352 A1* | 10/2010 | Hylands | B01D 53/90 60/273 |
| 2014/0298781 A1* | 10/2014 | Naga | F01N 3/2892 60/301 |
| 2015/0330348 A1* | 11/2015 | Mulye | F02M 61/1813 239/102.2 |

FOREIGN PATENT DOCUMENTS

| | | | | |
|---|---|---|---|---|
| DE | 112012000089 | | 9/2013 | |
| EP | 2500538 A1 | * | 9/2012 | ............. F01N 3/021 |
| FR | 2977632 | | 1/2013 | |
| JP | 2005155404 A | | 6/2005 | |
| WO | 2006122561 | | 11/2006 | |

\* cited by examiner

INJECTION MODULE AND EXHAUST SYSTEM HAVING AN INJECTION MODULE

BACKGROUND OF THE INVENTION

The invention relates to an injection module, in particular to an injection module for injecting a reducing agent into the exhaust tract of an internal combustion engine, and to an exhaust tract equipped with an injection module of said type.

SCR ("selective catalytic reduction") with a urea-containing reducing agent ("AdBlue®") is a proven technique for the denitrogenization of the exhaust gases of diesel engines. Here, the liquid reducing agent is injected in finely atomized form into the exhaust-gas flow upstream of a reducing agent catalytic converter.

To achieve a high level of conversion of the nitrogen oxides with the least possible reducing agent slippage, the reducing agent must be distributed over the catalytic converter inlet surface as homogeneously as possible. This is achieved either by way of mixers fitted in the exhaust pipe or by way of a long mixing path to the catalytic converter from the location at which the reducing agent is dosed in.

DE 44 17 238 A1 discloses a device for the reduction of nitrogen oxides in the exhaust gas of an internal combustion engine, having an inlet chamber, having a hydrolysis catalytic converter, having a DeNOx catalytic converter and having an oxidation catalytic converter, wherein the inlet chamber, the hydrolysis catalytic converter, the DeNOx catalytic converter and the oxidation catalytic converter form a substantially cylindrical unit through which the exhaust gas can flow in the stated sequence, and the diameter of the inlet chamber is greater than the diameter of the hydrolysis catalytic converter. It is achieved in this way that the exhaust gas that is mixed with a reducing agent in the inlet chamber enters the catalytic converters with a homogeneous reducing agent distribution and with an exhaust-gas flow density which is as homogeneous as possible over the cross section of the exhaust tract.

To realize the required homogenization of the reducing agent with the exhaust gas, a reducing agent spray mist ("spray") is required which, as far as possible, is flat but covers the full area. To avoid deposits of the reducing agent in the exhaust system, it is necessary that only a limited amount of the reducing agent impinges on the walls of the exhaust system.

SUMMARY OF THE INVENTION

It is an object of the invention to realize a high level of homogenization of the exhaust gases and of the reducing agent even in compact exhaust systems, and at the same time to minimize the impingement of reducing agent on the walls of the exhaust system.

An injection module (dosing module) according to the invention for injecting a reducing agent into the exhaust tract of an internal combustion engine has at least two outlet openings for discharging in each case at least one reducing agent primary jet. Here, the outlet openings are arranged and designed such that the reducing agent primary jets emerging through the outlet openings collide with one another and, as a result of the collision, produce a spray mist in the exhaust tract.

The invention also encompasses a method for injecting a reducing agent into the exhaust tract of an internal combustion engine, wherein the method comprises the injection of at least two reducing agent primary jets into the exhaust tract such that said reducing agent primary jets collide with one another and produce a suitable spray mist in the exhaust tract.

In this way, by way of a collision of jets in the exhaust tract, a flat and homogeneous reducing agent spray mist is produced which mixes optimally with the exhaust gases flowing through the exhaust tract and which thus permits effective pollutant reduction with low reducing agent consumption.

In one embodiment, the outlet openings have a spacing of less than 5 mm, in particular of less than 2 mm, to one another, such that the primary jets are, from the respective outlet opening to the collision point, compact jets which have not yet broken down into individual droplets. If the primary jets have already broken down into individual droplets, there is a persistent absence of collision partners; by contrast, by way of compact jets, the collision is optimized.

In one embodiment, the outlet openings are designed such that the reducing agent primary jets collide with one another at an angle of greater than 30°, in order to optimize the collision between the two primary jets and effect optimum atomization of the primary jets.

In one embodiment, the outlet openings are designed such that the reducing agent primary jets collide with one another after a free traveling distance of less than 10 mm, in particular of less than 5 mm, in order to avoid the primary jets from breaking up into individual droplets before the collision point.

The outlet openings preferably have a circular cross section, because the jet diameter and the outlet angle of the jet are precisely defined in the case of a circular cross section. The outlet openings may however also be formed with an oval cross section.

The invention also encompasses a section of an exhaust tract of an internal combustion engine in which an injection module according to the invention is provided.

In one embodiment, the section of the exhaust tract has, in addition to the injection module, a shield plate which is designed and arranged such that it prevents the spray mist from impinging on a wall of the exhaust tract. Undesired deposits of the reducing agent, which can adversely affect the flow characteristics in the exhaust tract, are reliably prevented in this way.

The shield plate may have one or more openings which permit a defined flow of the exhaust gas through the shield plate in order to targetedly influence the flow characteristic of the exhaust gases in the exhaust tract.

In one embodiment, the shield plate is arranged such that a stagnation space is formed between the shield plate and at least one wall of the exhaust tract. During operation, there is generated in the stagnation space an exhaust-gas positive pressure which effects a flow of exhaust gases through holes formed in the shield plate, which results in particularly effective mixing of the exhaust gases with the reducing agent atomized according to the invention.

In one embodiment, an additional plate is arranged upstream of the injection module in order to prevent the reducing agent spray mist from being blown away by the exhaust-gas flow at the collision point of the primary jets, and to thus ensure reliable spray mist production by the primary jets.

In one embodiment, an oxidation catalytic converter is arranged upstream of the injection module and a reduction catalytic converter is arranged downstream of the injection module in order to effect optimum exhaust-gas purification. The injection module is in particular arranged in a connecting duct which connects the outlet of the oxidation catalytic converter to the inlet of the reduction catalytic converter in order to supply the reducing agent to the exhaust gases immediately upstream of the reduction catalytic converter.

In one embodiment, the flow direction of the exhaust gases is changed by the connecting duct. This permits a particularly compact structural form of the exhaust tract, and generates turbulence in the exhaust-gas flow. Such turbulence of the exhaust-gas flow results in particularly effective mixing of the exhaust gases with the reducing agent spray mist.

DETAILED DESCRIPTION

Figure 1:
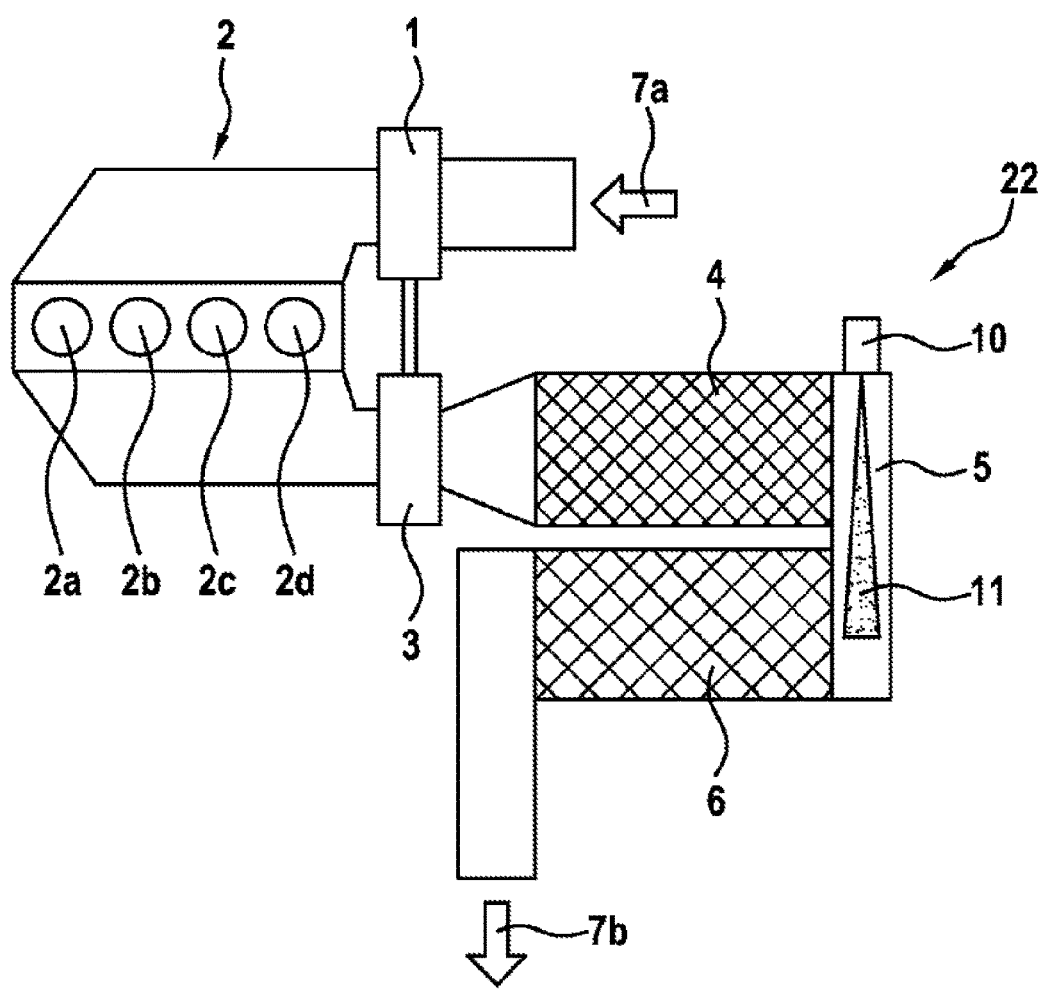
FIG. 1 shows a schematic sectional view of an exhaust tract according to the invention.

FIG. 1 shows a schematic view of an internal combustion engine 2 having an exhaust tract 22 designed according to the invention.

Fresh air 7a is delivered into the cylinders 2a-2d of the engine 2 by way of a compressor 1 of a turbocharger 1, 3. The exhaust gases produced in the cylinders 2a-2d during operation pass through a turbine 3 of the turbocharger 1, 3, which turbine drives the compressor 1, into an oxidation catalytic converter 4 arranged downstream of the internal combustion engine 2.

Adjacent to the oxidation catalytic converter 4 there is situated a reducing agent catalytic converter 6. The latter may be in the form of an SCR catalytic converter 6 or in the form of a particle filter with an SCR catalyst coating. The outlet of the oxidation catalytic converter 4 and the inlet of the reducing agent catalytic converter 6 are connected to one another in terms of flow by way of a connecting duct 5, such that the exhaust gases flow from the oxidation catalytic converter 4 through the connecting duct 5 into the reducing agent catalytic converter 6. The exhaust gases 7b purified by the catalytic converters 4, 5 emerge from the reducing agent catalytic converter 6 into the surroundings.

On the connecting duct 5 there is installed an injection module 10 according to the invention, which is supplied with a liquid reducing agent, in particular an aqueous urea solution ("AdBlue®"), from a conventional reducing agent dosing system, which is therefore not shown in detail.

During operation, the injection module 10 produces a reducing agent spray mist 11 in the connecting duct 5 between the oxidation catalytic converter 4 and the reducing agent catalytic converter 6.

Figure 2:
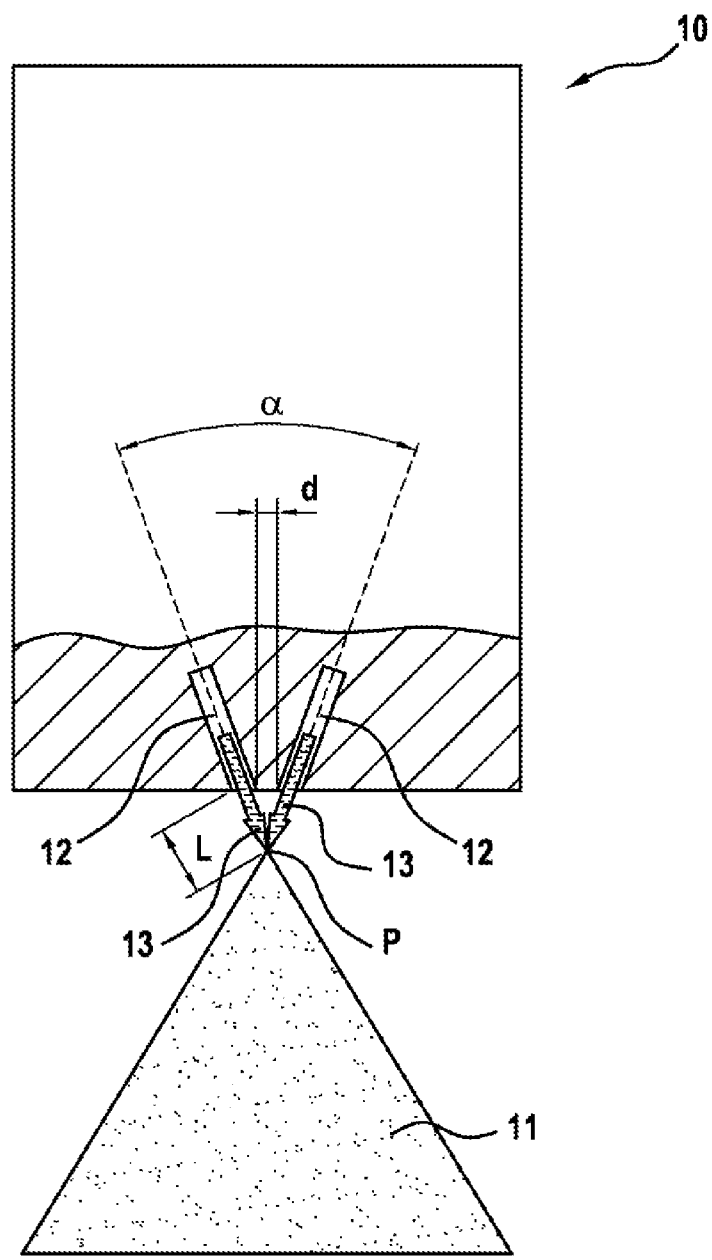
FIG. 2 shows a schematic partially sectional view of an injection module according to the invention.

FIG. 2 shows, in an enlarged partially sectional illustration, that end of the injection module 10 which faces toward the connecting duct 5. The injection module 10 shown in FIG. 2 has two outlet openings 12 for the reducing agent, through which outlet openings in each case one reducing agent primary jet 13 emerges during operation. Further exemplary embodiments of injection modules 10 according to the invention that are not shown in the figures may have additional outlet openings 12.

The primary jets 13 that emerge from the outlet openings 12 collide within the connecting duct 5 (not shown in FIG. 2) in the region in front of the injection module 10. Owing to the respective impetus of the primary jets 13, the collision causes a finely atomized reducing agent spray mist 11 to be produced in the connecting duct in accordance with the "collision beam principle". The reducing agent spray mist 11 produced in this way covers the full area and is a flat form and is thus particularly highly suitable for realizing effective mixing of the reducing agent with the exhaust gases which flow through the connecting duct 5.

The spacing d between the outlet openings 12 is less than 5 mm, in particular less than 2 mm. Owing to the small spacing d between the outlet openings 12, the primary jets 13, in the region between the outlet openings 12 and the collision point P of the two primary jets 13, are compact jets which have not yet broken down into individual droplets. By virtue of the fact that compact primary jets 13 collide with one another, the collision is optimized, because every part of a first primary jet 13 collides with a corresponding part of a second primary jet 13, and there are no gaps in the primary jets 13 in which no collision occurs.

The outlet openings 12 preferably have a circular cross section, because the jet diameter and the outlet angle of the primary jet 13 are precisely defined in the case of a circular cross section. The outlet openings 12 may however also be formed with an oval cross section.

It is also possible for further outlet openings 12 that are not shown in FIG. 2 to be provided in order to produce additional primary jets 13, which are preferably directed toward the same collision point P. Alternatively, multiple collision points P may be provided, toward which in each case at least two primary jets 13 are directed, such that each collision point P constitutes a spray mist source in the connecting duct 5.

In one embodiment, the outlet openings 12 are designed such that the primary jets 13 collide with one another at an angle α of greater than 30° in order to optimize the collision between the two primary jets 13 and thereby effect optimum atomization of the primary jets 13, whereby a particularly fine spray mist 11 is produced in the connecting duct 5, and the reducing agent is mixed with the exhaust gases in the exhaust tract 22 in a particularly effective manner.

In one embodiment, the outlet openings 12 are designed such that the primary jets 13 collide with one another after a free traveling distance L, that is to say downstream of the outlet from their respective outlet opening 12, of less than 10 mm, in particular of less than 5 mm. This reliably prevents a situation in which the primary jets 13 break down into individual droplets before the collision point P, which would reduce the effectiveness of the spray mist production.

Figure 3:
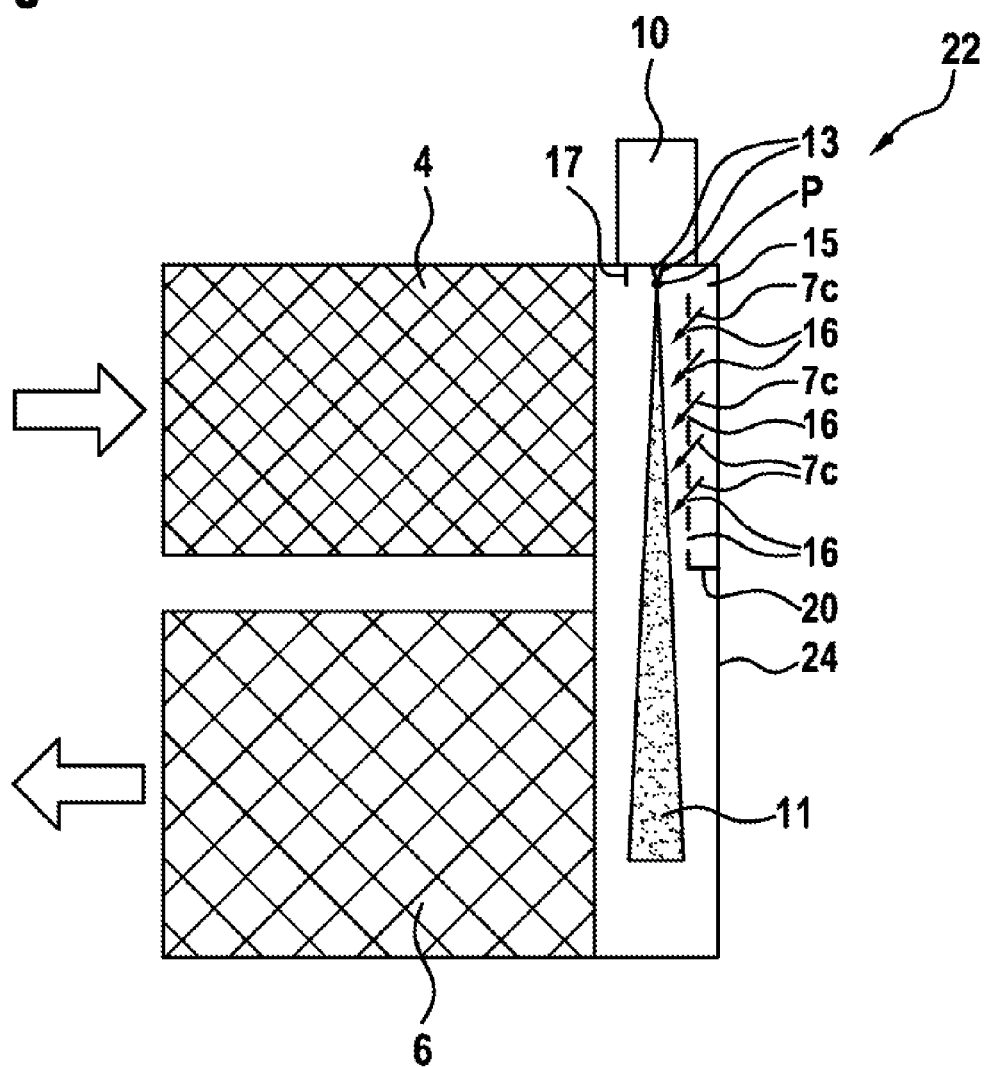
FIG. 3 is a sectional illustration of the connecting duct between the catalytic converters of the exhaust tract in an enlarged illustration.

FIG. 3 is a sectional illustration, on an enlarged scale, of the connecting duct 5 that connects the outlet of the oxidation catalytic converter 4 to the inlet of the reducing agent catalytic converter 6.

To prevent the reducing agent spray mist 11 produced by the collision of the primary jets 13 from being forced, by the exhaust-gas flow emerging from the oxidation catalytic converter 4, against that wall 24 (illustrated on the right in FIG. 3) of the connecting duct 5 which is situated opposite the oxidation catalytic converter 4, and forming undesired deposits there, a shield plate 20 is arranged in front of the wall 24, in particular between the injection module 10 and the wall 24. The shield plate 20 is narrower than the connecting duct 5, such that, to the side of (in the illustration of FIG. 3, above) the shield plate 20, a part of the exhaust-gas flow emerging from the oxidation catalytic converter 4 flows into a stagnation space 15 formed between the wall 24 of the connecting duct 5 and the shield plate 20 and generates a positive pressure (stagnation pressure) in said stagnation space.

The shield plate 20 may in particular be in the form of an inexpensive perforated plate.

Through openings 16 formed in the shield plate 20, the exhaust gases flow out of the stagnation space 15 into a region on that side of the shield plate 20 which faces toward the oxidation catalytic converter 4, where said exhaust gases are admixed with the reducing agent spray mist 11. The exhaust-gas flow from the stagnation space 15 through the openings 16 into the region of the spray mist 11 is symbolized by exhaust-gas flow arrows 7*c*.

An additional diverting plate 17 may be installed upstream adjacent to the injection module 10 in order to prevent the reducing agent spray mist 11 from being blown away at the collision point P of the primary jets 13, and in order to thus ensure reliable production of spray mist from the primary jets 13.

Figure 4:
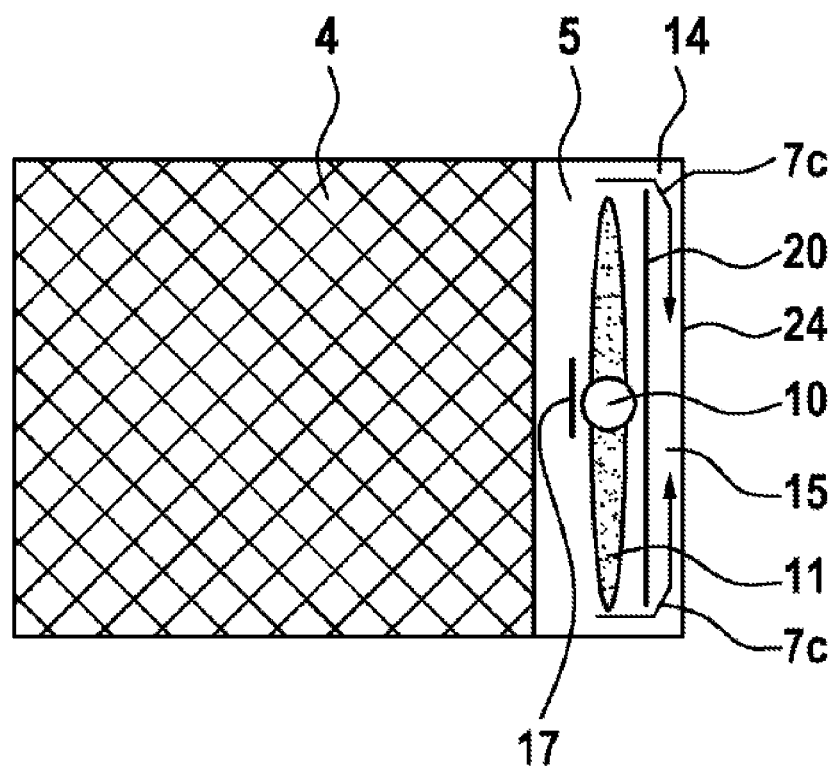
FIG. 4 is a sectional illustration of the connecting duct between the catalytic converters of the exhaust tract from a different viewing direction.

FIG. 4 is a sectional illustration of the exhaust tract 22 as viewed from the direction of the injection module 10, that is to say from above in the illustration of FIG. 3.

On the right-hand side of FIG. 4, it is possible, to the right of the oxidation catalytic converter 4, to see the connecting duct 5, the injection module 10 and the reducing agent spray mist 11 produced by the injection module 10.

The additional shield plate 17, as has been described above in conjunction with FIG. 3, is situated between the injection module 10 and the outlet of the oxidation catalytic converter 4, To the right of the injection module 10, it is possible to see the shield plate 20 between the reducing agent spray mist 11 and the wall 24 of the connecting duct 5. The stagnation space 15 described above can be seen between the shield plate 20 and the wall 24 of the connecting duct 5. The exhaust-gas flow into the stagnation space 15 is symbolized by exhaust-gas flow arrows 7*c*.

The invention claimed is:

1. A section of an exhaust tract of an internal combustion engine, the section comprising:
   an injection module for injecting a reducing agent into the exhaust tract,
   wherein the injection module has at least two outlet openings for discharging respective reducing agent primary jets, and
   wherein the outlet openings are oriented such that the reducing agent primary jets emerging through the outlet openings collide with one another and produce a spray mist in the exhaust tract; and
   a shield plate between the injection module and a wall of the exhaust tract such that the shield plate prevents the spray mist from impinging on the wall of the exhaust tract;
   wherein the injection module and the shield plate are positioned in a connecting duct of the exhaust tract located downstream of an outlet of an oxidation catalytic converter and upstream of an inlet of a reduction catalytic converter, the connecting duct configured to change a flow direction in the exhaust tract,
   wherein the shield plate is arranged on a side of the spray mist opposite to both of the oxidation catalytic converter and the reduction catalytic converter; and
   wherein the shield plate has one or more openings and is arranged such that a stagnation space is formed between the wall of the exhaust tract and the shield plate in the connecting duct, the shield plate being narrower than the wall of the exhaust tract in the connecting duct such that a portion of an exhaust-gas flow emerging from the oxidation catalytic converter flows into the stagnation space around a side of the shield plate and generates a positive stagnation pressure in the stagnation space.

2. The section of an exhaust tract as claimed in claim 1, wherein a further shield plate is arranged upstream of the injection module.

3. The section of an exhaust tract as claimed in claim 2, wherein the further shield plate is planar and is positioned entirely on an opposite side of the spray mist from the shield plate.

4. The section of an exhaust tract as claimed in claim 1, wherein the outlet openings have a spacing (d) of less than 2 mm to one another.

5. The section of an exhaust tract as claimed in claim 4, wherein the outlet openings are oriented such that the reducing agent primary jets collide with one another at an angle ($\alpha$) of greater than 30°.

6. The section of an exhaust tract as claimed in claim 5, wherein the outlet openings are oriented such that the reducing agent primary jets collide with one another after a free traveling distance (L) of less than 5 mm.

7. The section of an exhaust tract as claimed in claim 1, wherein the shield plate is planar.

8. A section of an exhaust tract of an internal combustion engine, the section comprising:
   an injection module for injecting a reducing agent into the exhaust tract,
   wherein the injection module has at least two outlet openings for discharging respective reducing agent primary jets, and
   wherein the outlet openings are oriented such that the reducing agent primary jets emerging through the outlet openings collide with one another and produce a spray mist in the exhaust tract;
   an oxidation catalytic converter upstream of the injection module and a reduction catalytic converter downstream of the injection module; and
   a shield plate between the injection module and a wall of the exhaust tract such that the shield plate prevents the spray mist from impinging on the wall of the exhaust tract;
   wherein the injection module and the shield plate are positioned in a connecting duct of the exhaust tract located downstream of an outlet of the oxidation catalytic converter and upstream of an inlet of the reduction catalytic converter, the connecting duct configured to change a flow direction in the exhaust tract; and
   wherein the shield plate has one or more openings and is arranged such that a stagnation space is formed between the wall of the exhaust tract and the shield plate in the connecting duct and on a side of the spray mist opposite to both the oxidation catalytic converter and the reduction catalytic converter, the shield plate being narrower than the wall of the exhaust tract in the connecting duct such that a portion of an exhaust-gas flow emerging from the oxidation catalytic converter flows into the stagnation space around a side of the shield plate and generates a positive stagnation pressure in the stagnation space.

9. The section of an exhaust tract as claimed in claim 8, wherein the outlet openings have a spacing (d) of less than 5 mm to one another.

10. The section of an exhaust tract as claimed in claim 8, wherein the outlet openings are oriented such that the reducing agent primary jets collide with one another at an angle (α) of greater than 30°.

11. The section of an exhaust tract as claimed in claim 8, wherein the outlet openings are oriented such that the reducing agent primary jets collide with one another after a free traveling distance (L) of less than 10 mm.

12. The section of an exhaust tract as claimed in claim 8, wherein a further shield plate is arranged upstream of the injection module.

13. The section of an exhaust tract as claimed in claim 8, wherein the outlet openings have a spacing (d) of less than 2 mm to one another.

14. The section of an exhaust tract as claimed in claim 13, wherein the outlet openings are oriented such that the reducing agent primary jets collide with one another at an angle (a) of greater than 30°.

15. The section of an exhaust tract as claimed in claim 14, wherein the outlet openings are oriented such that the reducing agent primary jets collide with one another after a free traveling distance (L) of less than 5 mm.

16. The section of an exhaust tract as claimed in claim 8, wherein the shield plate is planar.

* * * * *